(12) United States Patent
Contardo et al.

(10) Patent No.: US 11,193,458 B2
(45) Date of Patent: Dec. 7, 2021

(54) AIR SUCTION DEVICE FOR A VEHICLE EQUIPPED WITH AN INTERNAL COMBUSTION ENGINE

(71) Applicant: KTM AG, Mattighofen (AT)

(72) Inventors: Luca Contardo, Seekirchen am Wallersee (AT); Anton Guzhov, Salzburg (AT)

(73) Assignee: KTM AG, Mattighofen (AT)

( * ) Notice: Subject to any disclaimer, the term of this patent is extended or adjusted under 35 U.S.C. 154(b) by 122 days.

(21) Appl. No.: 16/406,744

(22) Filed: May 8, 2019

(65) Prior Publication Data

US 2019/0345904 A1 Nov. 14, 2019

(30) Foreign Application Priority Data

May 9, 2018 (DE) .......................... 102018111179.7

(51) Int. Cl.
*F02M 35/10* (2006.01)
*F02M 35/024* (2006.01)

(52) U.S. Cl.
CPC .... *F02M 35/024* (2013.01); *F02M 35/10242* (2013.01)

(58) Field of Classification Search
CPC .. F02M 35/02; F02M 35/024; F02M 35/0201; F02M 35/0205; F02M 35/10; F02M 35/10242; F02M 35/10013; F02M 35/10072; F02M 35/10091; F02M 35/10111; F02M 35/10249; F02B 27/005;

(Continued)

(56) References Cited

U.S. PATENT DOCUMENTS

| 7,270,207 B2* | 9/2007 | Idei ................. F02M 35/10262 180/68.3 |
| 7,427,152 B2* | 9/2008 | Erion .................... F21S 41/148 362/547 |

(Continued)

FOREIGN PATENT DOCUMENTS

| DE | 10 2013 211 357 A1 | 4/2014 |
| DE | 10 2016 110 894 A1 | 12/2016 |

(Continued)

OTHER PUBLICATIONS

Notice of Reasons for Refusal, JP2019087174, dated Nov. 10, 2020. (Year: 2020).*

(Continued)

*Primary Examiner* — Grant Moubry
(74) *Attorney, Agent, or Firm* — Rob D. Baker

(57) ABSTRACT

An air suction device for a vehicle equipped with an internal combustion engine. The air suction device includes a device guiding purified suction air for combustion in the direction of the internal combustion engine, and an air filter element and a housing receiving the air filter element, and at least one air guiding device. The air guiding device is formed in the shape of a channel and is provided for guiding suction air to the housing. The air guiding device extends in the region between a holding device and the housing. The holding device is formed to receive at least one light source and has an air leading channel adjacent to the light source, which is connected in an air guiding manner to the air guiding device.

14 Claims, 13 Drawing Sheets

(58) Field of Classification Search
CPC ......... F21S 45/43; B62K 19/32; B62K 11/04;
B62J 6/02; B62M 7/02; B60K 13/02;
Y02T 10/12
See application file for complete search history.

(56) References Cited

U.S. PATENT DOCUMENTS

| | | | | |
|---|---|---|---|---|
| 8,162,101 | B2* | 4/2012 | Ono | F02M 35/10354 |
| | | | | 181/229 |
| 8,746,774 | B2* | 6/2014 | Yasuhara | B60Q 1/28 |
| | | | | 296/78.1 |
| 9,004,209 | B2 | 4/2015 | Kontani et al. | |
| 9,669,704 | B2 | 6/2017 | Nakayama et al. | |
| 10,106,219 | B2* | 10/2018 | Takakuwa | F02M 35/048 |
| 10,392,067 | B2* | 8/2019 | Srivirat | F21S 43/241 |
| 2007/0091632 | A1* | 4/2007 | Glovatsky | F21V 29/70 |
| | | | | 362/547 |
| 2014/0090912 | A1 | 4/2014 | Kontani et al. | |
| 2016/0368369 | A1 | 12/2016 | Nakayama et al. | |

FOREIGN PATENT DOCUMENTS

| | | |
|---|---|---|
| JP | S57-137531 U | 8/1982 |
| JP | 558-70418 U | 5/1983 |
| JP | H11208554 A | 8/1999 |
| JP | 2011173504 A | 9/2011 |

OTHER PUBLICATIONS

KTM AG, "Bedienungsanleitung 2019," Operator's Manual for 1290 Super Adventure S, Aug. 2018, Germany.
KTM AG, "Bedienungsanleitung 2018," Operator's Manual for 1290 Super Duke R, Oct. 2017, Germany.
Japanese Patent Office, Office Action on Japanese Patent App. No. 2019-087174 (counterpart to U.S. Appl. No. 16/406,744), dated Nov. 10, 2020.
English machine translation of Office Action on Japanese Patent App. No 2019-087174 (counterpart to U.S. Appl. No. 16/406,744), dated Nov. 10, 2020.

* cited by examiner

AIR SUCTION DEVICE FOR A VEHICLE EQUIPPED WITH AN INTERNAL COMBUSTION ENGINE

CROSS-REFERENCE TO RELATED APPLICATIONS

This application claims priority to and the benefit of the filing of German Patent Application No. DE 10 2018 111 179.7 entitled "Air suction device for a vehicle equipped with an internal combustion engine," filed 9 May 2018, the entire disclosure of which is incorporated herein by reference.

BACKGROUND OF THE INVENTION

Field of the Invention

The present invention relates to an air suction device for a vehicle equipped with an internal combustion engine.

Background Art

A generic air suction device is known from a motorcycle design of the applicant, in which two air guiding devices are provided in the form of channels provided with a rectangular cross-section, and that end in a housing in which an air filter element is provided. The purified air is then supplied to a throttle valve device by means of a device in the form of two air guides and, downstream of this, to the internal combustion engine.

The channels mentioned above extend forwards starting from an end-face front side of the housing when viewed in the driving direction of the motorcycle, and outwards on both sides starting from a longitudinal central plane of the housing, such that, when viewing the known configuration from above, the respective air inlet opening of the channel is located outside the outer lateral peripheral boundary lines of the housing. This configuration is necessary because the channels, with their air inlet openings, must extend around a lamp mask receiving the main headlight of the motorcycle, since the lamp mask (which receives and surrounds the main headlight with its planar lateral extension) otherwise prevents fresh air or suction air from entering the air inlet openings of the channels. Such a vehicle has lateral cladding elements arranged to the side of a main frame of the motorcycle, which laterally cover the channels, such that the air inlet openings are located inside the lateral cladding elements.

Although this known configuration has already proved to be most successful, it nevertheless has room for improvement in that, in the longitudinal direction of the vehicle, the construction width of the known air suction device needs desirably to be reduced and thus the construction width of the vehicle overall can be reduced, whereby the front face influencing the vehicle wind resistance of the motorcycle can simultaneously be reduced.

SUMMARY OF THE INVENTION

The present invention thus relates to an air suction device for a vehicle equipped with an internal combustion engine. The air suction device has a device guiding purified suction air for the combustion in the direction of the internal combustion engine, and an air filter element and a housing receiving the air filter element and at least one air guiding device, which is formed like a channel and is provided for guiding suction air to the housing. Based on the foregoing, an object of the present invention is to develop an air suction device in such a way that an air suction device is set with a smaller construction width when seen transversely to the longitudinal direction of the vehicle, and thus the construction width of the vehicle overall is reduced. A vehicle equipped with this air suction device also is provided.

To solve this object in terms of the air suction device, the present invention has the features specified in the claims. Advantageous embodiments thereof are described in the further claims.

BRIEF DESCRIPTION OF THE DRAWINGS

The invention is explained in more detail by means of the drawings. Here are shown.

DISCLOSURE OF A PREFERRED EMBODIMENT

Figure 1:
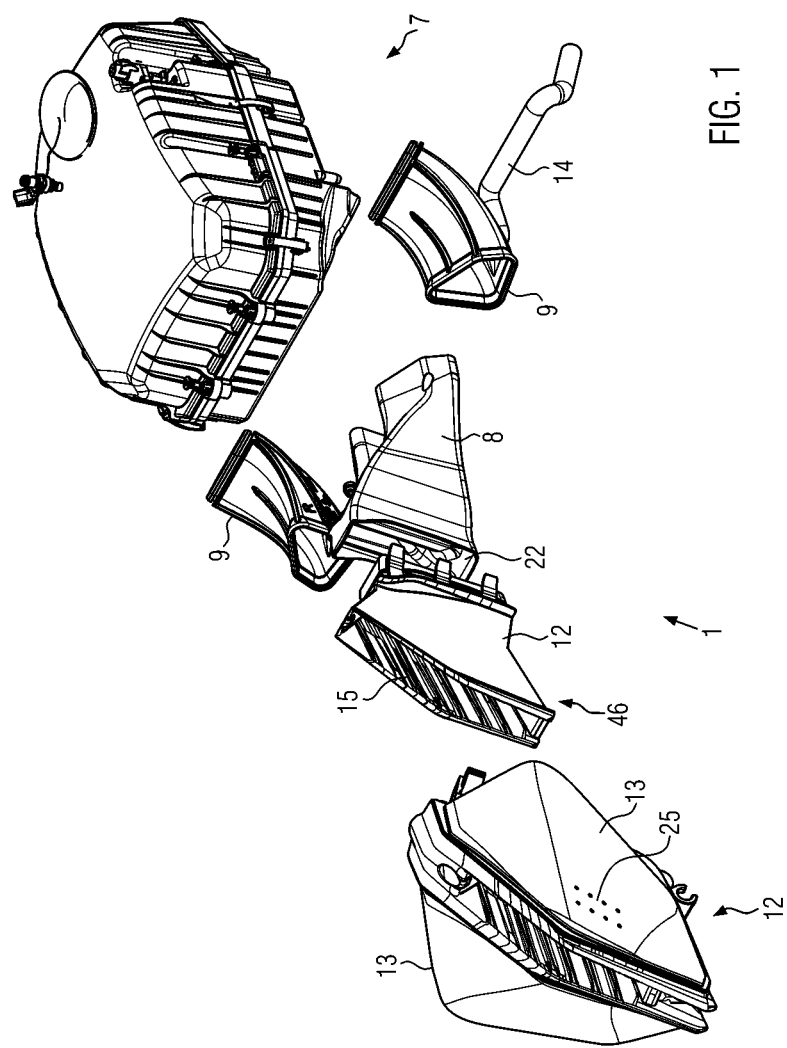
FIG. 1 is an exploded perspective view of an embodiment of the air suction device according to the present invention.

The invention creates an air suction device for a vehicle equipped with an internal combustion engine, having a device guiding purified suction air for the combustion in the direction of the internal combustion engine, and an air filter element and a housing receiving the air filter element and at least one air guiding device. The air guiding device is formed like a channel and is provided to guide suction air to the housing, wherein the air guiding device extends in the region between a holding device and the housing, and the holding device is formed to receive at least one illuminant (light source) and has an air leading channel adjacent to the illuminant, said channel being connected to the air guiding device in an air guiding manner.

With the design of the air suction device according to the present invention, it is achieved that a multifunctional component is provided in the form of the holding device by means of the integration of the air leading channel adjacent to the illuminant into the holding device, said component both being formed to receive at least one illuminant source of light and simultaneously carrying out the function of leading or guiding the suction air by means of the air leading channel to the air guiding device.

The holding device is advantageously arranged centrally, for example, in the longitudinal direction of the vehicle, or in the region of the longitudinal central plane of the vehicle, such that the air guiding device extends in the direction of the housing of the air suction device, starting from the holding device.

The holding device is advantageously arranged at the front on the vehicle, i.e., on or near the front end region of the vehicle when seen in the vehicle longitudinal direction or driving direction of the vehicle during forwards travel, such that, during forwards travel of the vehicle, the suction air reaches the air guiding device via the air guiding channel of the holding device. Thus, a dynamic pressure charging takes place by means of this configuration depending on the driving speed of the vehicle and, in addition, the configuration ensures that the air guiding channel is found arranged adjacently to the illuminant, and that the suction airflow flowing through the air leading channel can dissipate the heat transferred from the illuminant to the holding device. The holding device thus simultaneously acts as a cooling body or cooling device for the illuminant(s).

The illuminant(s) can advantageously be light diodes, which are arranged, for example, on a control board or circuit board, which serves to simultaneously receive the light diode or the light diodes and which is arranged in or on the holding device in such a way that the waste heat of the light diodes and the control electronic system arranged on the control board or circuit board is transferred to the holding device, which is passed through or penetrated by the air guiding channel, such that the suction air flowing through the air guiding channel can simultaneously function as a cool airflow.

As a result of the configuration that the air guiding device extends in the region between the holding device and the housing, it is achieved that the air guiding device extends in the forward direction from the housing of the air suction device and thus nestles closely to the longitudinal central plane of the vehicle when viewed in the driving direction of the vehicle. Thus, in comparison to known air suction devices, a clear reduction of the lateral dimension of the air suction device is achieved in the width direction of the vehicle.

Thus, a multifunctional device is created by the air suction device according to the invention, said multifunctional device serving for the air supply for the internal combustion engine, simultaneously reducing the width extension of the vehicle and also serving as a cooling body or cooling device for the illuminant(s) of the vehicle.

According to a development of the invention, it is provided that the air guiding device has at least two air guiding channels sectionally running extensively parallel, which are formed integrally connected to each other at an end region. This configuration ensures that the parallel running air guiding channels are provided to be closely abutting on the longitudinal central plane of the vehicle, starting from the housing of the air suction device, and thus the suction airflow entering the air guiding channels can flow with high flow speed in the direction of the housing of the air suction device and, in this way, fluid friction losses can be reduced by wall attachments of the airflow in the air guiding channels.

According to a development of the invention, it is provided that the air suction device has a respective air guiding channel, which is connected to an inlet opening of the housing in an air guiding manner by means of a suction air line formed in the manner of a curve, and a respective end region of the air guiding channel is formed to be releasably connectable to an allocated coupling region of the suction air line in the form of a plugged connection. This configuration leads to the respective air guiding channel, starting from the air leading channel of the holding device in the direction of the housing, having a suction air line similar to a snorkel, which can be produced the simple mounting when manufacturing the vehicle equipped with the air suction device according to the invention without using tools, by means of bringing about a simple plug connection between the suction air line and the air guiding channel.

It has proved to be advantageous when the suction air line has a configuration aligned regionally or sectionally downwards starting from the air guiding channel, because, in this way water entering the air leading channel of the holding device (when driving the vehicle in rain) in the direction of the suction air line can be removed via an output bore provided in the suction air line before the water enters the housing of the air suction device.

According to a development of the invention, it is provided that the holding device is a body formed with the air leading channel arranged between side walls, said body having first and second body elements connecting the side walls and enclosing the air leading channel together with the side walls, and having an air outlet region facing towards the air guiding device. The side walls can simultaneously serve as cooling bodies for the dissipation of the heat emitted by the illuminant(s) and its control electronic system and, together with the first and second body elements, which connect the side walls, form a region enclosing the air leading channel. The enclosing region forms an air inlet region in the front region of the holding device (in the driving direction of the vehicle) and has an air outlet region in the rear region of the air outlet device (again, in the driving direction of the vehicle), said air outlet region facing towards the air guiding device. The air leading channel of the holding device can also have a tapering configuration in the region between the air inlet region and the air outlet region, for example, such that the suction air flowing through the air leading channel undergoes a flow acceleration.

According to a development of the invention, it is also provided that the holding device has at least one receiving surface for arranging or mounting at least one illuminant, and the receiving surface is formed for dissipating heat of the illuminant. The receiving surface can, for example, serve for arranging the control board or circuit board mentioned above, such that the heat emitted by the illuminants formed as light diodes, for example, is dissipated via the receiving surface to the side walls of the holding device, which are actively cooled by the suction air flowing through the air leading channel on the side facing towards the air leading channel.

According to a development of the invention, it is also provided that the holding device has a configuration that is extensively complementary in terms of shape and area to the configuration of an air inlet region of the air guiding device on an end region of the air leading channel, said end region facing towards the air guiding device.

With its arrangement on a motorcycle, for example, the holding device can be arranged in the region of the upper fork bridge of a front wheel fork of the motorcycle, such that the holding device undergoes pivoting movements in the event of turning movement of the motorcycle, together with the front wheel fork relative to the longitudinal central axis or longitudinal central plane of the motorcycle. Accordingly, an angle change of the air outlet region of the air leading channel of the holding device is set relative to the air inlet region of the air guiding device.

As a result of the configuration of the end region of the air leading channel complementarily in terms of shape and area relative to the air inlet region of the air guiding device, it is achieved that the suction air flowing through the air leading channel extensively laminarly experiences only a few fluid disruptions impeding the laminar flow in the transition region between the air leading channel and the air inlet channel of the air guiding device, and thus a high current speed is set in the whole suction air region in front of the housing of the air suction device.

According to a development of the invention, it is also provided that the holding device has receiving surfaces for arranging covering plates covering illuminants on outer regions of the side walls, said outer regions facing away from the air guiding channel. As a result of this configuration, it is achieved that covering plates can be arranged on the side walls on both sides of the air guiding channel, which can pass through the holding device completely, said covering plates thus being arranged on both sides of the air guiding channel and each bordering a receiving space between the side walls and the covering plates, in which the illuminant(s) can be arranged.

In this way, in each case one receiving space is arranged on both sides of the air guiding channel, in which receiving space the control boards with the light diodes arranged thereon are arranged on the respective receiving surface mentioned above, and the respective receiving space is spanned on the outside of the covering plates. The air guiding channel passes through the holding device completely and is thus arranged between the covering plates, and the suction air flowing through the air guiding channel cools the rear side of the respective side wall, said rear side respectively allocated to the air guiding channel. As a result of the receiving spaces provided on both sides of the air guiding channel for illuminants, a number adjusted to the respective need for light strength of the illuminants of the vehicle can be integrated on the illuminants in the form of light diodes, for example.

According to a development of the invention, it is provided that side walls of the holding device have a configuration similar to a triangle in a side view, and upper regions of the side walls are formed integrally with the first body element, and the side walls are formed integrally with the second body element at a distance to lower regions of the side walls. As a result of this configuration, a configuration of the air leading channel of the holding device is formed, as it were, said configuration being similar to an inlet funnel and ensuring a high flow speed of the suction air in the region of the air leading channel of the holding device.

According to a development of the invention, it is provided that the holding device has means for arranging at least one receiver for bearing at least one illuminant, and the means and/or the receiver and/or the illuminant is functionally coupled to the holding device for heat transfer to the holding device. The means can be, for example, one or more threaded bores, on which the receiver bearing an illuminant can be set in the form of a circuit board, for example. For example, the means can also be a recess formed in the shape of a spacer formed, for example, from an elastomer for receiving an elastic component, such that, with the elastic spacer(s), the circuit board having the light diodes arranged thereon can be set on the holding device to absorb vibration or decoupled from vibration. This configuration ensures that vibrations caused by the internal combustion engine of the vehicle, for example, are not transferred to the light diode, or are transferred only with attenuation.

According to a development of the invention, it is also provided that the air leading channel of the holding device having a guiding device or guiding surface for guiding the air flowing through the air leading channel is formed in contact with a surface of at least one side wall, said surface being warmed by the illuminant emitting heat. The guiding device or guiding surface can, for example, be an air leading surface integrated into the air leading channel, said surface leading the suction air flowing into the air leading channel specifically onto the region of the side wall or the side walls of the holding device, said region being warmed mostly via the dissipated heat of the illuminant.

According to a development of the invention, it is also provided that the end region of the air guiding device has a transition region extending cross-sectionally in the direction of the air inlet region, said transition region being allocated to the air leading channel of the holding device. In this way, it is achieved that the suction air flowing out of the air outlet region of the air leading channel of the holding device also emerges specifically in the air inlet region of the air guiding device, even with an angle change of the holding device relative to the air guiding device—for example because of the pivoting movements of the holding device mentioned above in the event of steering movements on the vehicle, and not, for example, flush on a wall surface bordering the air inlet region of the air guiding device. This configuration ensures that a high speed of the suction air passing through the air leading channel is prevented, even in the event of steering movements.

Finally, the invention also creates a vehicle having at least one front wheel and at least one rear wheel and an internal combustion engine, which has an air suction device, as has been described above. The vehicle can, for example, be a single-track vehicle in the form of a motorcycle, or also a multi-track vehicle in the form of an all-terrain vehicle or an ATV or quadbike.

Reference is made to the drawings. The air suction device 1 is provided, for example, for arrangement on the motorcycle 2 depicted in FIG. 13 of the drawings. The motorcycle 2 has an internal combustion engine 3, which, in the depicted embodiment of the motorcycle, is a V2 engine.

Figure 2:
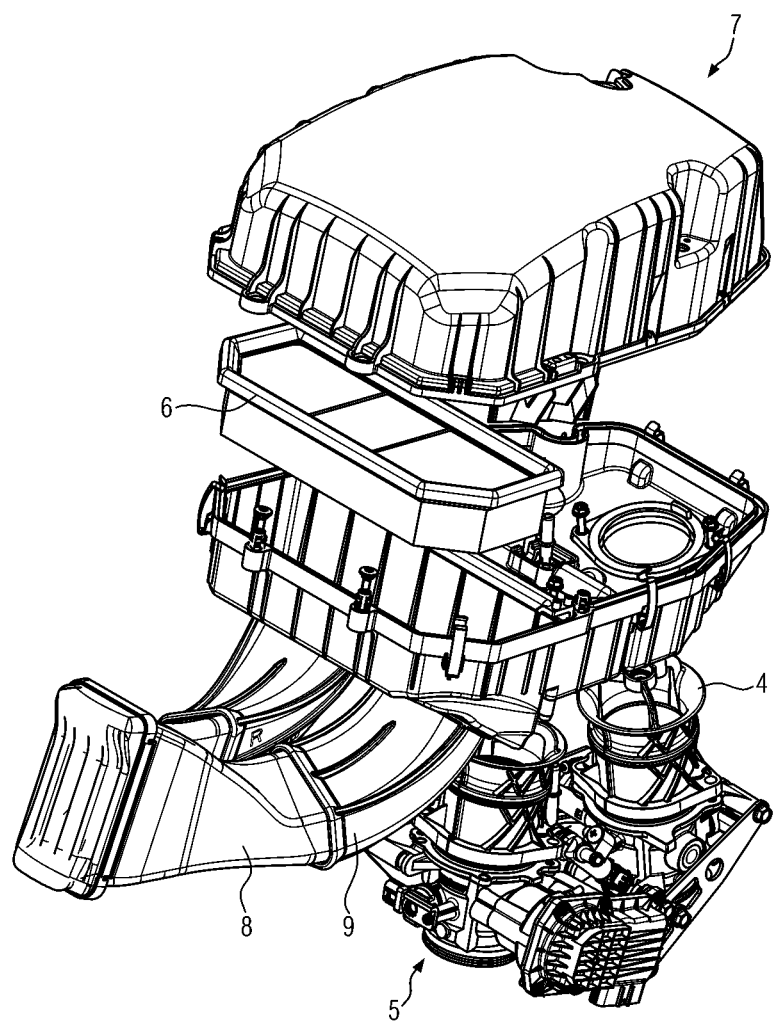
FIG. 2 is an exploded perspective view of elements of the air suction device.

The air suction device 1 has a device guiding purified suction air for the combustion in the direction of the internal combustion engine, said device generally being a channel-shaped body or air guiding means and, in the depicted embodiment, being the funnel or air guiding funnel 4 visible in FIG. 2 of the drawings, which can also constitute, for example, a part of a throttle valve body 5. The air guiding means are able to guide purified air in the direction of an inlet region of the internal combustion engine 3 for the inlet of the suction air and/or a suction air fuel mixture into the combustion space of the respective cylinder of the internal combustion engine 3 via an air filter element 6.

Moreover, the air suction device 1 has a housing 7 for the air filter element 6 and has an air guiding device 8 formed in the shape of a channel, which ends in suction air lines 9, which guide the still non-purified suction air in the direction of the housing 7. After the still non-purified suction air has entered the housing or air filter housing 7, it is guided through the air filter element 6 to purify the suction air and then emerges again in the direction of the funnels 4 via the inner space 10 of the housing 7, in order to finally reach the combustion spaces of the internal combustion engine 3.

As seen in FIG. 1 of the drawings, a holding device 12 (depicted in more detail in FIGS. 5-8 of the drawings) is provided on the air inlet region 11 (FIG. 3) of the air guiding device 8, said holding device 12 serving both to guide the suction air in the direction of the air guiding device 8 and to receive at least one illuminant of the motorcycle 2 and having a body generally labelled with the reference numeral 46. Moreover, for the sake of explanation, FIG. 1 of the drawings also shows the holding device 12 still provided with covering plates 13, which serve to protect and cover the illuminants provided on the holding device 12. In the holding device 12 depicted in the drawings, the illuminants 25 are arranged on both sides of the air guiding channel 15 in the inner spaces or regions provided below the covering plates 13.

A tube 14 depicted in FIG. 1 of the drawings, which is arranged on the suction air line 9, serves to dissipate condensation or water which can enter the air guiding device 8, for example when driving the motorcycle 2 in the rain. The water is removed before it can enter the housing 7 of the air suction device 1. The second suction air line 9 also has a tube (not shown in FIG. 1) for removing water or condensation.

The holding device 12 is provided with an air leading channel 15 visible in more detail by means of the further figures, into which the suction air can enter on the front region and further exit in the direction of the air inlet region of the air guiding device 8 on the rear region of the holding device 12.

Figure 3:
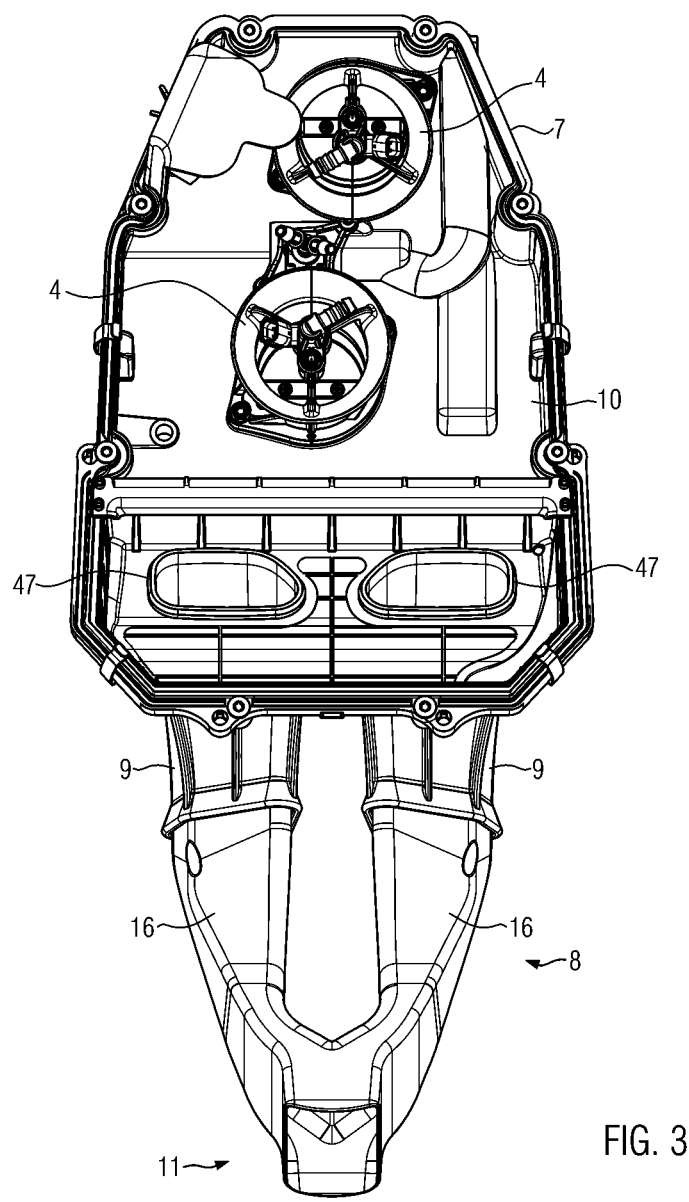
FIG. 3 is top plan view of elements of the air suction device.

As seen in FIG. 3 of the drawings, the air guiding device 8 has two air guiding channels 16 running sectionally in parallel, which end in the suction air lines 9 in the region toward the rear of the drawings. Here, the air guiding channels 16 have a respective end region formed complementarily to the inlet region of the suction air lines 9 in the region of the suction air lines 9, such that the air guiding channels 16 having the suction air lines 9 can be releasably connected to one another in the form of a plugged connections with the use of tools being required during mounting in order to do so.

Figure 4:
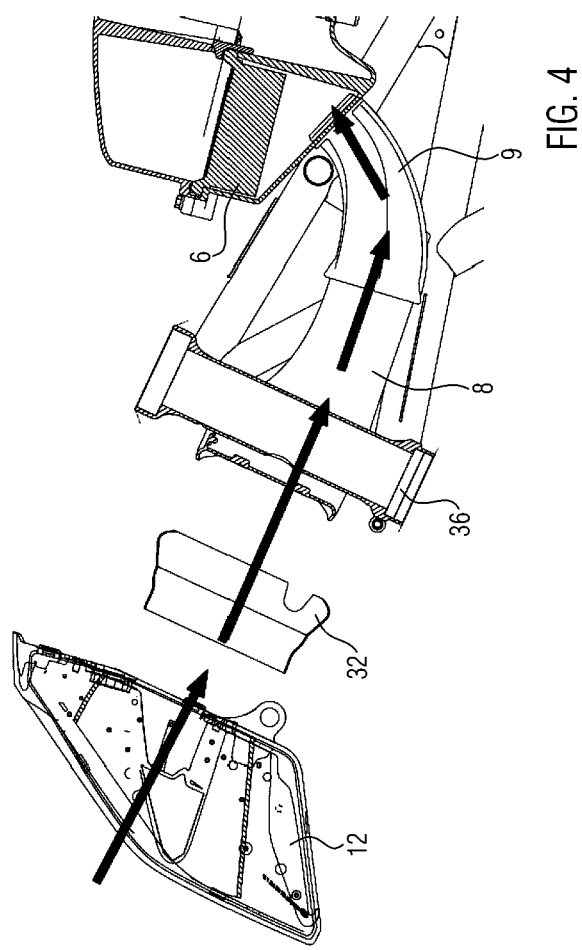
FIG. 4 is a schematic side sectional view of the invention to explain the guiding of the suction air in the direction of the housing of the air suction device.

The suction air lines 9 are formed curved and end in a respective inlet opening 47 of the housing 7. Because of the arrangement and formation of the air suction device 1 according to the invention, air flowing via an air inlet on the front region of the air guiding channel 15 (as is depicted in FIG. 4), and the further guiding of the air via the air guiding device 8 and the suction air lines 9 in the direction of the air filter element 6, there results a dynamic pressure charge on the power of the internal combustion engine 3.

Figure 5:
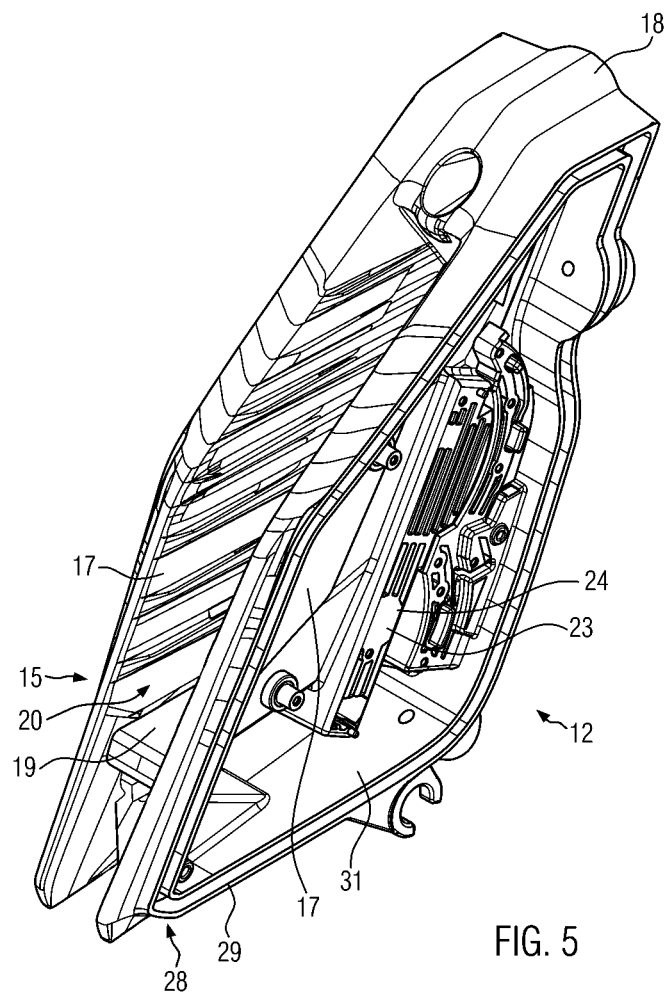
FIG. 5 is a perspective view of a holding device of the air suction device.

FIG. 5 of the drawings shows a perspective depiction of the multifunctional holding device 12 of the air suction device 1 according to the invention. The holding device 12 has two side walls 17, which enclose the air leading channel 15 between them, which channel is defined from the side walls 17 and a first or upper body element 18 and a second or lower body element 19 of the body 46. The channel 15 has an air inlet region 20 on the front or front-face region and an air outlet region 21 (FIG. 6) on the rear or back-facing region, which is allocated to the air inlet region 22 (FIG. 1) of the air guiding region 8.

The air leading channel 15 thus serves to guide the suction air through the holding device 12 into the air inlet region 22 of the air guiding device 8. In the depicted embodiment of the air suction device 1, the holding device 12 is formed from a light metal alloy, for example an aluminium alloy, such that the suction air entering through the air guiding channel 15 comes into contact with the side walls 17 of the holding device 12 and, in this way, can remove heat from the side walls 17, which heat is emitted onto the side walls by the illuminants 25.

FIG. 5 of the drawings shows a receiving surface 23, which is formed to arrange at least one illuminant 25 (which are schematically depicted in FIG. 1), and has a surface 24 on which the heat emitted by the illuminant(s) 25 is transferred to the holding device 12 and, in particular here, to the side walls 17. The heat is dissipated via the suction air passing through the air leading channel 15, such that, on one hand, the holding device 12 serves to guide the air of the suction air and, on the other hand, also the removal of heat of the illuminants 25. The illuminants can be formed as light diodes. The holding device additionally has a receiving body for the arrangement of the illuminants 25.

Figure 6:
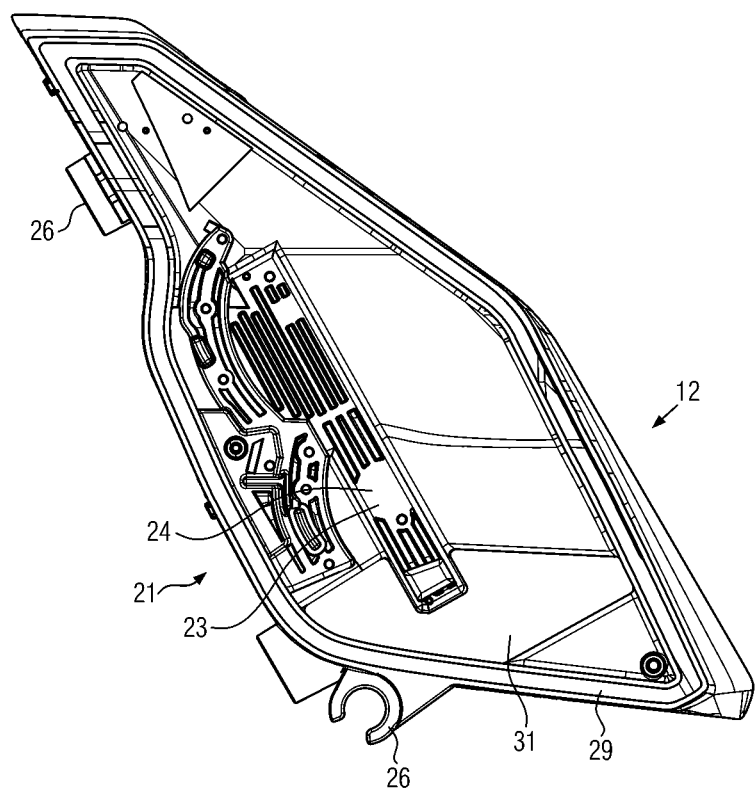
FIG. 6 is right side view of the holding device seen in FIG. 5.

FIG. 6 of the drawings shows the holding device 12 in a depiction from the right-hand side and makes it clear that the holding device 12 respectively has a receiving surface 23 for illuminants 25, and a surface 24 for removing the heat emitted by the illuminants 25 on the side walls 17 on both sides of its longitudinal central plane. Here, the illuminants 25 can be arranged on the surfaces 24, for example via receivers bearing the illuminants in the form of circuit boards not depicted in more detail, and the arrangement of the circuit boards on the surfaces 24 leads to the heat emitted by the light diodes 25 being dissipated via the circuit boards to the receiving surfaces 23, which is transferred from there to the side walls 17 via thermal conduction and/or convection and/or radiation and is dissipated there by the air leading channel 15 by through-flowing suction air.

Figure 7:
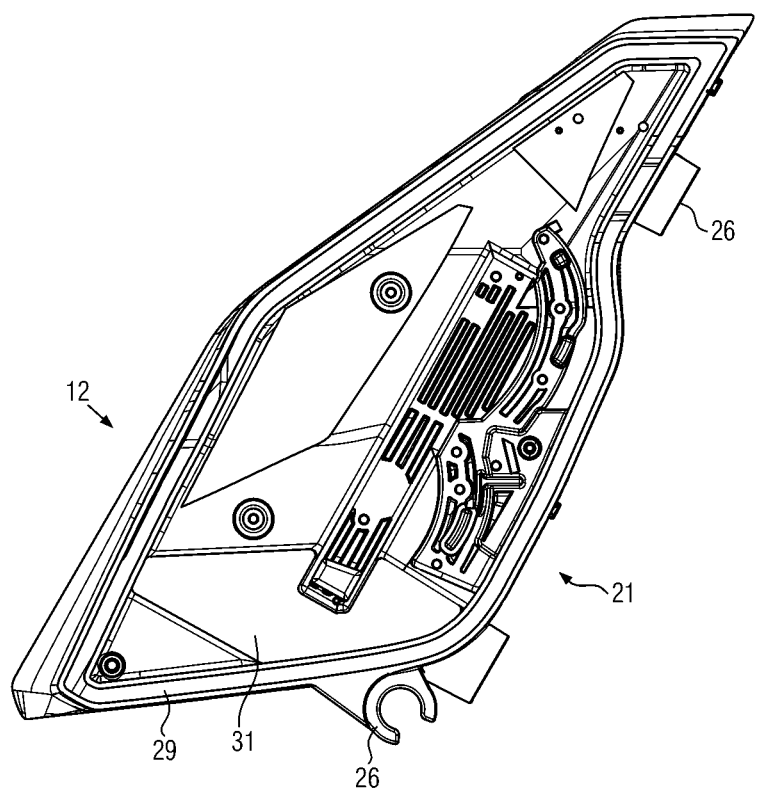
FIG. 7 is a left side of the holding device seen in FIG. 5.
Figure 13:
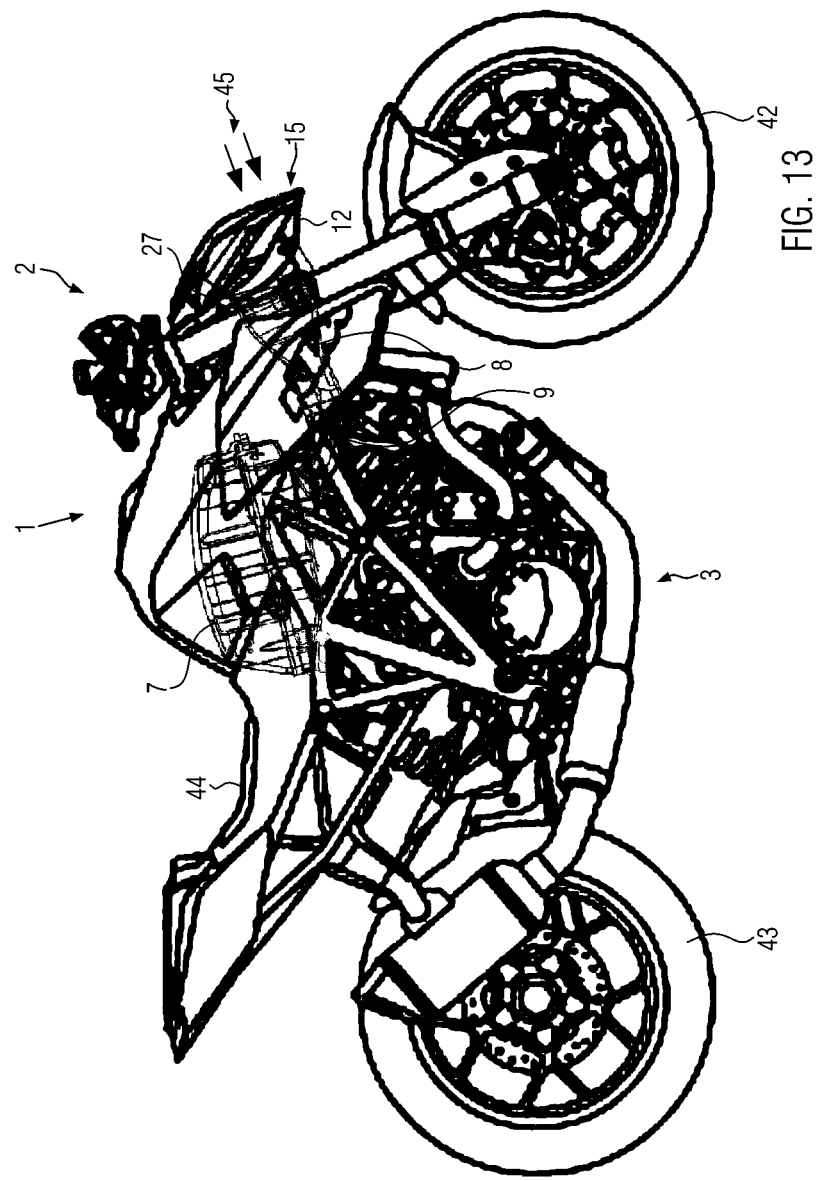
FIG. 13 is a side view of a schematically depicted motorcycle having installed thereon the air suction device according to the present invention.

As is depicted, for example, by means of FIG. 7, the holding device 12 has an extensively triangular configuration in a side view and has recesses 26, which serve to arrange the holding device 12 on frame components 27 of the motorcycle 2, as is depicted in FIG. 13. The holding device 12 also has receiving surfaces 29 formed as peripheral grooves 30 on the two side walls 17 on the outer region 28 spaced apart from the air leading channel 15 for the arrangement of the covering plates 13 depicted in FIG. 1. Plates 13 are able to transmit light therethrough, and cover the respective receiving space 31 of the holding device 12 for the arrangement of the illuminants 25 and finish outwards. In this way, the illuminants 25 are protected from environmental influences in the form of rain and dirt, for example, and can irradiate via the transparently formed covering plates 13.

Figure 8:
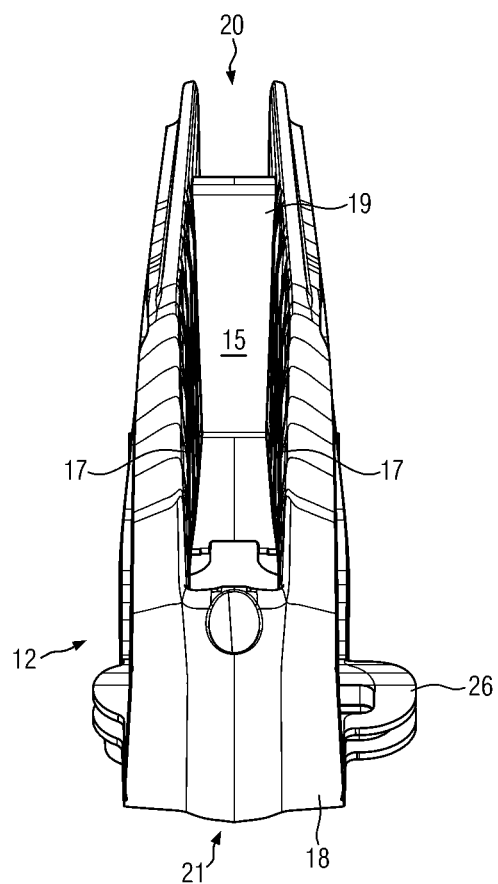
FIG. 8 is top view from above of the holding device.

FIG. 8 of the drawings shows a view of the holding device 12 from above. As is readily obvious, the air leading channel 15 is formed to taper between the side walls 17 in the direction of the air outlet region 21 when viewed from the air inlet region 20. This configuration ensures that the suction air flowing through the air leading channel 15 experiences a current acceleration on its way through the air guiding channel 15. This is a configuration for improving the power of the internal combustion engine 3 by improving of the degree of fullness of the combustion spaces of the internal combustion engine 3.

Figure 9:
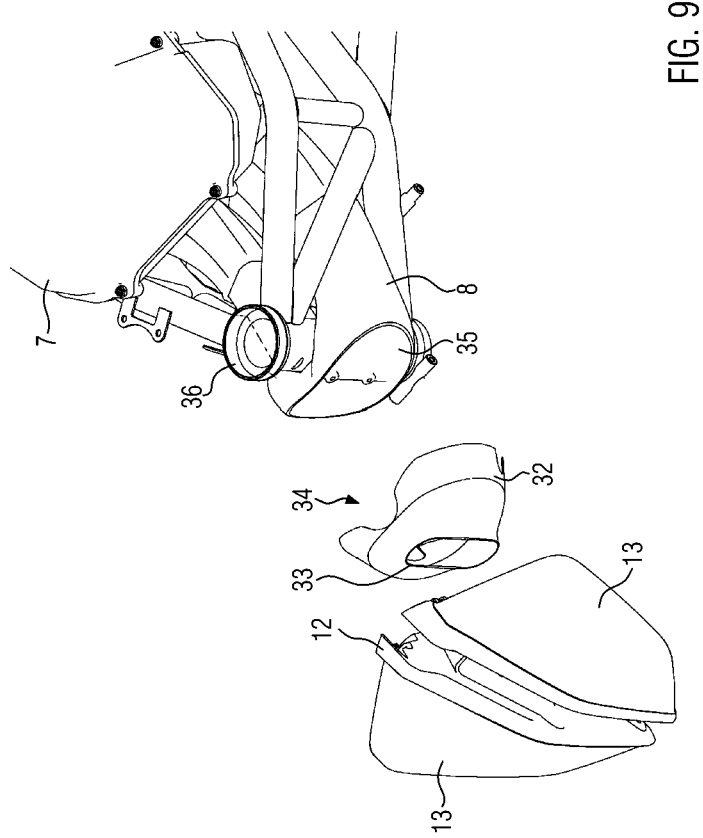
FIG. 9 is a partially exploded perspective view of an air suction device according to a modified embodiment of the present invention.

FIG. 9 shows a modified embodiment of the air suction device 1, which differs from the embodiment depicted in FIG. 1 in that an air guiding funnel 32 is provided between the holding device 12 and the air guiding device 8. The air guiding funnel 32 has a funnel inlet region 33, which is formed to be complementary in terms of shape and area to the air outlet region 21 of the holding device 12, and an extending funnel outlet region 34, which is formed to be complementary in terms of shape and area to the air inlet region 35 of the air guiding device 8.

Figure 10:
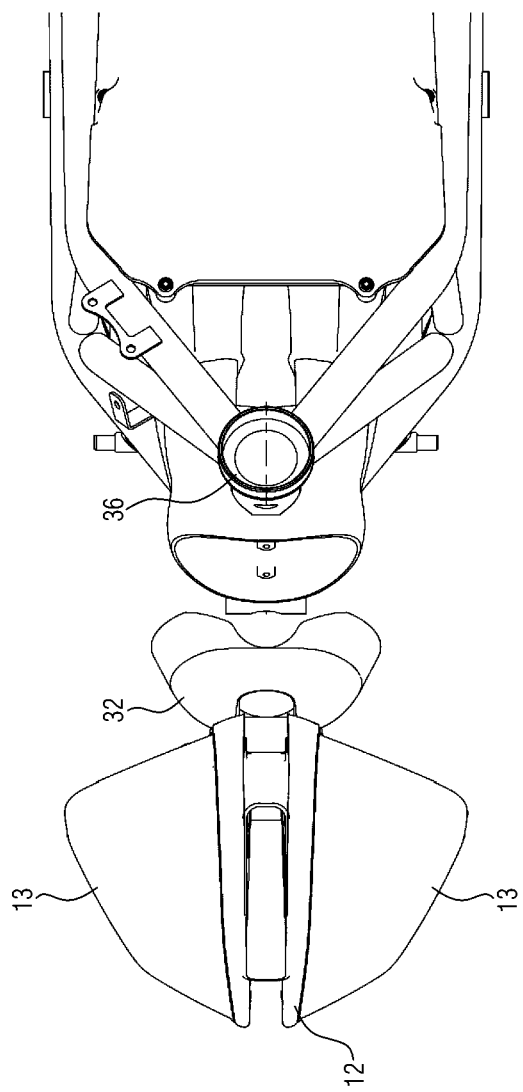
FIG. 10 is an exploded schematic view, from above, of an air suction device according to the modified embodiment in a rotation angle position.

FIG. 10 illustrates that the air guiding funnel 32 can be pivoted along with the holding device 12 around the steering head bearing tube 36 in the event of a steering movement on the motorcycle 2. Because of its formation that is complementary in terms of shape and area to the inlet region 35 (FIG. 9) of the air guiding device 8, the air guiding funnel 32 can be pivoted without the formation of an enlarging gap region between the inlet region 35 and the funnel outlet region 34. Thus, a deterioration of the flow characteristics of the suction air provided by the air suction device 1 because of a steering movement on the motorcycle can be avoided. The air guiding funnel 32 can be formed from an elastomer, for example a rubbery substance, which nestles into the funnel inlet region 33 of the air guiding funnel 32.

Figure 11:
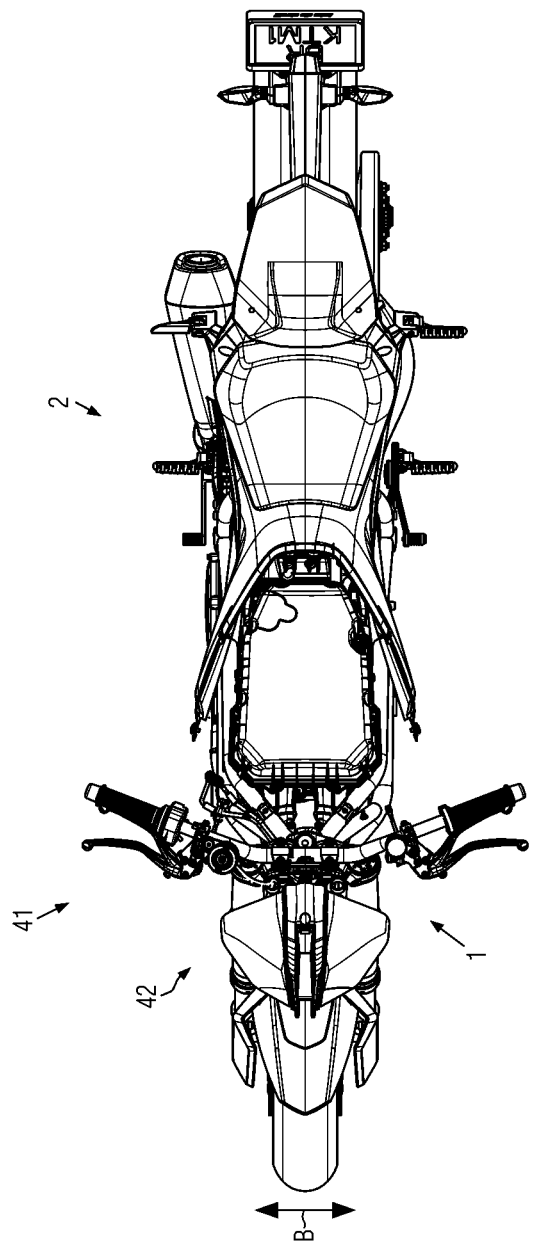
FIG. 11 is top view of a motorcycle equipped with the air suction device according to the present invention.
Figure 12:
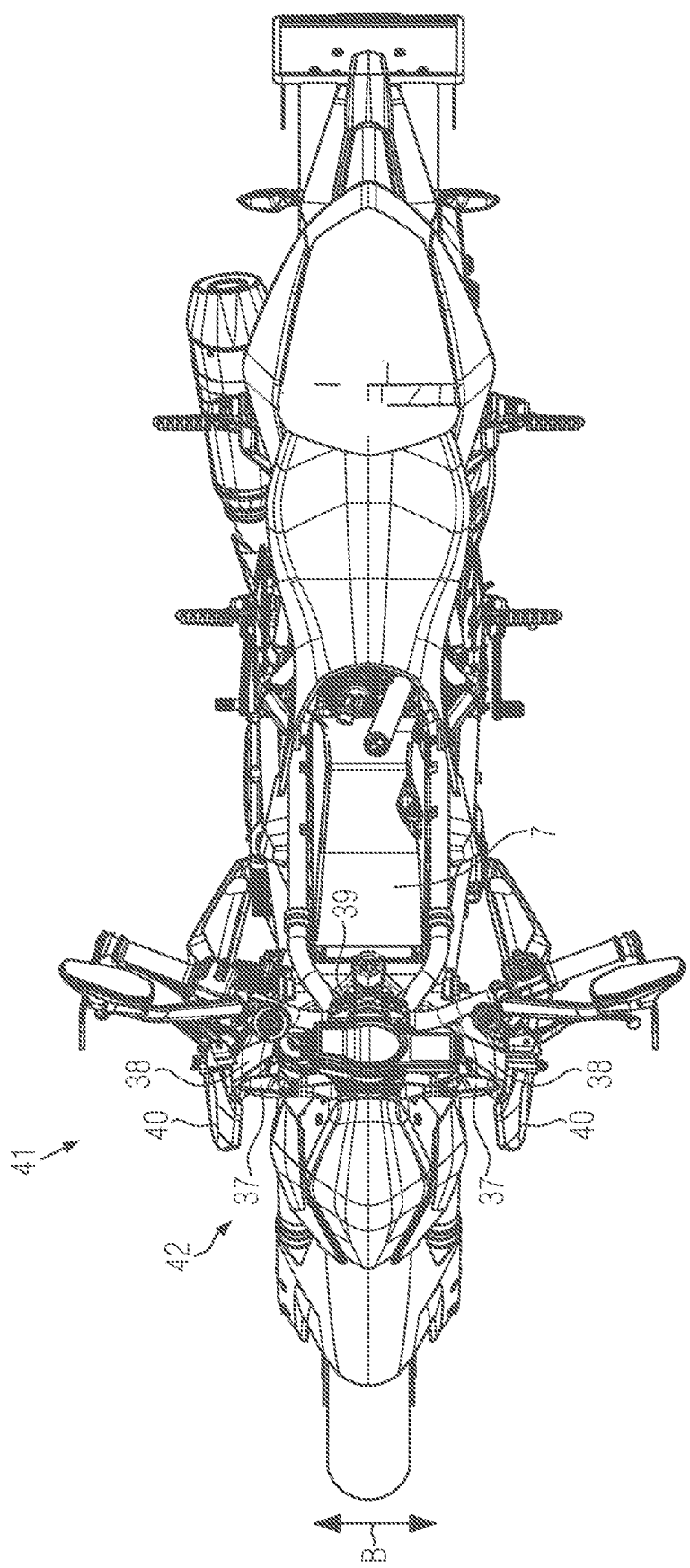
FIG. 12, which may be compared to FIG. 11, is a top view of a motorcycle equipped with the known air suction device of the prior art.

FIG. 11 shows a view from above of a motorcycle 2 equipped with the air suction device 1 according to the present invention. In comparison to this, FIG. 12 shows, in top view, a known motorcycle (a type designed by the applicant) equipped with a known variety of air suction device. The known air suction device has air inlet regions provided with the reference numeral 37 in air guiding channels 38, which run around the steering head bearing tube 39 and are covered from the outside by cladding components 40. Now, if this end face region 41 of the known motorcycle according to FIG. 12 is compared to the end face region 41 of the motorcycle 2 having the air suction device 1 according to the invention, it becomes immediately clear that the end face 42 of the known motorcycle is substantially larger in the side-to-side direction of the double arrow B in direct comparison to the end face 42 of the motorcycle according to FIG. 11 of the drawings, and thus the air resistance of the known motorcycle is also greater. The reduction of the air resistance of the motorcycle 2 having the air suction device according to the invention ensures a more efficient configuration in terms of the achievable fuel consumption, and moreover ensures that the overall optical impression of the motorcycle is improved because of the configuration of the motorcycle 2 that is narrower in the width direction.

FIG. 13 of the drawings shows a motorcycle 2 provided with the air suction device 1 according to the invention in a side view, wherein the motorcycle has a front wheel 42, a back wheel 43, a driver saddle 44 and the internal combustion engine 3 mentioned above. As is evident from FIG. 13, the suction air—depicted symbolically with the air flow arrows 45—enters the air leading channel 15 and is guided from there via the air guiding device 8 and the suction air lines 9 to the housing 7 of the air suction device 1 according to the invention. The holding device 12 is formed with its air leading channel 15 both for guiding the suction air and for receiving the illuminants 25 (seen in FIG. 1 of the drawings) in the form of light diodes and can remove heat emitted by the light diodes during operation via the suction air flowing through the air guiding channel 15, such that a multifunctional configuration was created with the air suction device according to the invention.

In terms of the features of the invention not explained in more detail above, in general, reference is explicitly made to the claims and the drawings.

LIST OF REFERENCE NUMERALS

1. Air suction device
2. Motorcycle
3. Internal combustion engine
4. Funnel
5. Throttle valve body
6. Air filter element
7. Housing
8. Air guiding device
9. Suction air line
10. Inner space
11. Air inlet region
12. Holding device
13. Covering plate
14. Tube
15. Air leading channel
16. Air guiding channels
17. Side wall
18. First body element
19. Second body element
20. Air inlet region
21. Air outlet region
22. Air inlet region
23. Receiving surface
24. Surface
25. Illuminant
26. Receiver
27. Frame
28. Region
29. Receiving surface
30. Groove
31. Receiving space
32. Air guiding funnel
33. Funnel inlet region
34. Funnel outlet region
35. Inlet region
36. Steering head bearing tube
37. Air inlet region
38. Air guiding channel
39. Steering head bearing tube
40. Cladding components
41. Front face region
42. Front wheel
43. Back wheel
44. Driver saddle
45. Arrows
46. Body
47. Inlet opening
B: Width extension

What is claimed is:

1. An air suction device for a vehicle equipped with an internal combustion engine, having a device guiding purified suction air for combustion in the direction of the internal combustion engine, and an air filter element and a housing receiving the air filter element and at least one air guiding device formed in the shape of a channel for guiding suction air to the housing, wherein the air guiding device extends in the region between a holding device and the housing, characterized in that the holding device, when viewed in a driving direction of the vehicle, is provided on both sides of a vertical longitudinal central plane with a respective receiving surface for illuminants on a respective side wall of the holding device, the receiving surfaces being mutually parallel, wherein each respective receiving surface is provided, interiorly to the respective receiving surface, with a surface receiving heat dissipated from the illuminants to the respective side wall, and wherein the holding device is provided with an air leading channel adjacent to the illuminants, the air leading channel being connected to the air guiding device in an air-guiding manner, and in that the air leading channel is formed by the side walls.

2. The air suction device according to claim 1 wherein the air guiding device defines at least two air guiding channels running extensively parallel in sections, the air guiding channels integrally connected near an air inlet region.

3. The air suction device according to claim 2 wherein each air guiding channel is connected in an air guiding manner to an inlet opening of the housing by a suction air line, and an end region of each air guiding channel is releasably connectable to a coupling region of the suction air line in the form of a plugged connection.

4. The air suction device according to claim 2 wherein an end region of the air guiding device has a transition region extending cross-sectionally in the direction of the air inlet region, the transition region being allocated to the air leading channel of the holding device.

5. A vehicle having an at least one front wheel and at least one rear wheel and an internal combustion engine, comprising the air suction device according to claim 2.

6. The air suction device according to claim 1 wherein the holding device comprises a body formed with the air leading channel arranged between side walls, the body comprising:
a first body element and a second body element connecting the side walls and, with the side walls, enclosing the air leading channel;
an air inlet region; and
an air outlet region facing towards the air guiding device.

7. The air suction device according to claim 6 wherein the air leading channel of the holding device guides air flowing through the air leading channel into contact with a surface of at least one side wall, the surface being heated by warmth emitted by the illuminant.

8. The air suction device according to claim 6 wherein the holding device comprises receiving surfaces for arranging covering plates to cover the at least one illuminant on outer regions of the side walls facing away from the air guiding channel.

9. The air suction device according to claim 8 wherein each of the side walls of the holding device comprises a generally triangular configuration in a side view, and wherein upper regions of the side walls are formed integrally with the first body element, and the side walls are formed integrally with the second body element at a distance apart from the lower regions of the side walls.

10. The air suction device according to claim 9 wherein the air leading channel is defined between the side walls and the integrally formed regions of the holding device.

11. The air suction device according to claim 1 wherein the receiving surfaces dissipate heat of the illuminants.

12. The air suction device according to claim 1 wherein the air guiding device comprises an air inlet region, and wherein the holding device defines, at an end region of the air leading channel, a configuration complementary in shape and area to the configuration of the air inlet region.

13. The air suction device according to claim 1 wherein the holding device comprises means for arranging at least one receiver bearing the at least one illuminant, and wherein the arranging means, or the receiver, or the illuminant, is functionally coupled to the holding device for transferring heat to the holding device.

14. The air suction device according to claim 1 wherein the holding device is arranged pivotably in an air flowing region of the vehicle relative to a vertical of the vehicle.

* * * * *